United States Patent [19]

Sato

[11] 4,315,460
[45] Feb. 16, 1982

[54] DRUM TYPE LINE PRINTER

[75] Inventor: Yo Sato, Tokyo, Japan

[73] Assignee: Kabushiki Kaisha Sato, Japan

[21] Appl. No.: 117,269

[22] Filed: Jan. 31, 1980

[30] Foreign Application Priority Data

Feb. 15, 1979 [JP] Japan .................................. 54-17144

[51] Int. Cl.³ .............................................. B41J 9/12
[52] U.S. Cl. .................................. 101/93.09; 101/69;
101/110; 101/93.48
[58] Field of Search ............... 101/93.01, 93.09, 93.11,
101/93.21, 93.29–93.34, 93.38, 93.39, 93.40,
93.48, 66, 69, 95, 96, 99, 110

[56] References Cited

U.S. PATENT DOCUMENTS

| 3,604,347 | 9/1971 | Muterspaw | 101/93.09 |
| 3,730,085 | 5/1973 | Beck | 101/110 |
| 4,027,586 | 6/1977 | Hubbard | 101/66 X |
| 4,189,997 | 2/1980 | Wozaki et al. | 101/93.09 |

OTHER PUBLICATIONS

Gilbert, IBM Tech. Discl. Bulletin, vol. 17, No. 5, Oct. 1974, pp. 1320–1321.

Primary Examiner—Edward M. Coven
Attorney, Agent, or Firm—Ostrolenk, Faber, Gerb & Soffen

[57] ABSTRACT

The disclosure concerns a drum type line printer for printing bar codes in a line. The drum type line printer includes information bars which are arranged in a preset numnber of files or bar code characters in a line. Two files or bar code characters of control bars, serving as start and end code bars, are arranged in line with the respective line of information bars. The same number of printing hammers are provided as the number of files or characters of the information bars. Each information bar is struck by a respective hammer so that the bar codes thereof may be printed. The control bars are simultaneously hit by those printing hammers which hit the information bars in the adjacent files.

4 Claims, 2 Drawing Figures

DRUM TYPE LINE PRINTER

BACKGROUND OF THE INVENTION

1. Field of the Invention

The present invention relates to a drum type line printer for printing bar codes in a line.

2. Description of the Prior Art

Bar codes are of a variety of types. But each bar code is generally composed of both information bars, which are comprised of a plurality of figures that together indicate a number, and control bars, including start and end code bars. The control bars are typically arranged at the both ends of the information bars.

When those grouped information bars and the respective control bars in a line are to be printed by a drum type line printer, according to the prior art, they are struck by printing hammers, which are independent of one another. As a result, the same number of printing hammers is required as the sum of the numbers of the information bars and the control bars.

Often each of the control bars has a fixed content irrespective of the varying contents of the grouped information bars in the various lines on the drum.

SUMMARY OF THE INVENTION

With the foregoing background in mind, it is the primary object of the present invention to provide a drum type line printer, in which the number of printing hammers may be reduced.

It is another object of the invention to have the control bars, such as start code bars or end code bars, be commonly struck by the printing hammers that strike information bars in the same line, and particularly the adjacent information bar, so that the number of printing hammers required may be accordingly reduced.

According to a major feature of the present invention, a drum type line printer for printing bar codes in a line is provided. The line printer comprises a circumferential array of information bars, each arranged in a preset number of files or bar code characters to provide figures in the number of the files in a line. At least one file or bar code character of control bars is arranged in line with the respective line of information bars. Printing hammers are provided in the same number as the number of files of information bars for hitting the information bars so that the information bar code characters may be printed. According to the invention, the control bar code characters are commonly hit by one of the printing hammers which is operative to hit one of the information bars, and preferably the information bar code character in the file adjacent to the control bar code character.

Other objects and features of the invention will be apparent from the following description and accompanying drawings.

DESCRIPTION OF A PREFERRED EMBODIMENT

Figure 1:
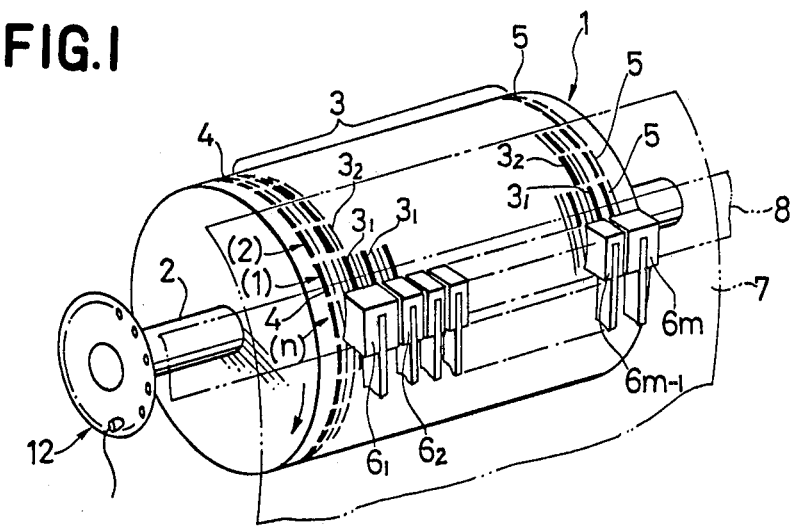
FIG. 1 is a perspective view showing an essential portion of a drum type line printer according to the present invention.
Figure 2:
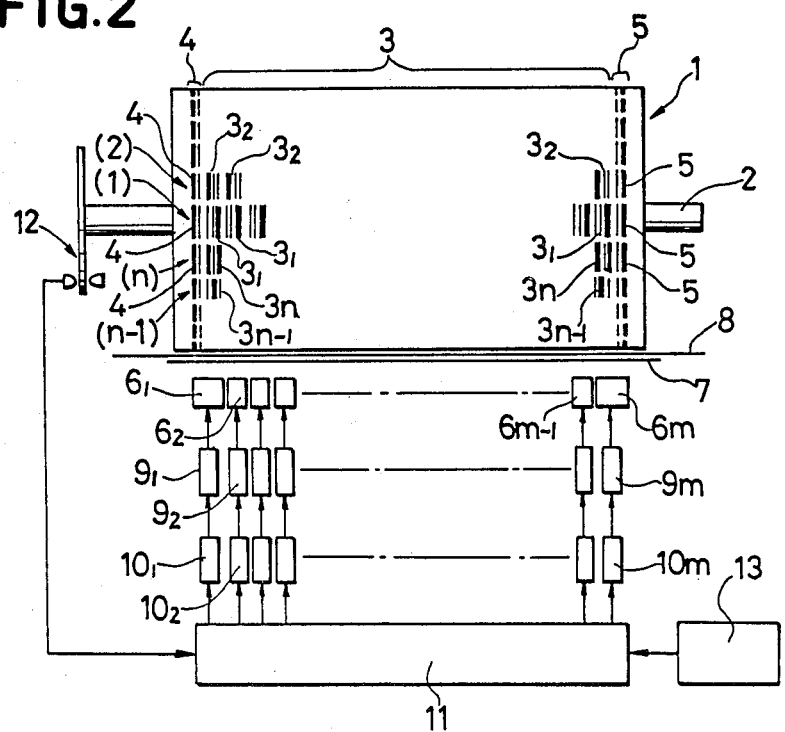
FIG. 2 is a diagrammatical view showing the positional relationships among the information and control bars of a printing drum and their respective printing hammers and also showing a block diagram circuit, which is operative to drive the printing hammers in an independent manner so that the information bar characters and the control bar characters may be printed.

A printing drum 1 is adapted to be turned by means of a prime mover (not shown) together with a shaft 2 of rotation. On the outer circumference of the printing drum 1, there are a number of imprintable information bars 3, start code bars 4 and end code bars 5 which are placed in line in both the axial and circumferential directions, respectively.

More specifically, the first axial line is composed of information bars $3_1$ indicating a numeral "1", and the second axial line is composed of information bars $3_2$ indicating a numeral "2". Likewise the nth line is composed of information bars $3_n$ indicating another numeral. All of these information bars $3_1$, $3_2$, - - - , and $3_n$ are arranged in m figures (e.g. individual numeral codes or characters) in each line in the axial direction of the printing drum 1. The information bars 3, which are arranged in the m figures, files or characters in the axial direction of the printing drum 1, are placed in the n lines in the circumferential direction upon the outer circumference of the printing drum 1. Moreover, each line has one end formed with the common start code bar 4 and the other end formed with the common end code bar 5. As a result, the information bars 3 are provided in m×n pieces whereas the start code bars 4 and the end code bars 5 are provided in n pieces, respectively.

Printing hammers $6_1$, $6_2$, - - - , and $6_m$ are provided in m pieces corresponding to the figures, characters or files of each information bar 3 and the hammers are arranged along the axial direction of the printing drum 1 and they face the drum. The printing hammers $6_1$, $6_2$, - - - , $6_m$ are used to hit the corresponding information bars 3, start code bars 4 and the end code bars 5 through both a medium 7 to be printed, e.g. a slip of paper or a label, and an ink ribbon 8 so that the medium 7 may be printed with the bar codes. Moreover, both the printing hammer $6_1$ for printing the information bars $3_1$, $3_2$, - - - , and $3_n$ of the first figure or the highest unit, which is located adjacent to the start code bars 4 or at the left hand end of the drawings, and the printing hammer $6_m$ for printing the information bars $3_1$, $3_2$, - - - , and $3_n$ of the last figure or the lowest unit, which is located adjacent to the end code bars 5 or at the right hand end of the drawings, are made wider than the remaining middle printing hammers $6_2$, $6_3$, - - - , and $6_{m-1}$ so that the first printing hammer $6_1$ can hit not only the information bars $3_1$, $3_2$, - - - , $3_n$ of the first figure but also the start code bars 4 whereas the last printing hammer $6_m$ can hit not only the information bars $3_1$, $3_2$, - - - , and $3_n$ of the last figure but also the end code bars 5.

Electro-magnets $9_1$, $9_2$, - - - , and $9_m$, when energized, drive the printing hammers $6_1$, $6_2$, - - - , and $6_m$, respectively. The magnets $9_1$, $9_2$, - - - , and $9_m$, are so electrically connected that they may be energized by hammer drive circuits $10_1$, $10_2$, - - - , and $10_m$, respectively.

A printer drive control circuit 11, which is responsive to both the input information coming from a sensor 12 for detecting the rotational position of the printing drum 1 and the printing information coming from an operating unit 13, controls the operations of the respective hammer drive circuits $10_1$, $10_2$, - - - , and $10_m$.

In the foregoing, the start code bars 4 and the end code bars 5 are the control bars. However, the present invention can extend to a modification, in which a center bar acts as one of the control bars and is additionally provided at the center of grouped information bars. In this modification, it is sufficient that the printing operation of the center bar is commonly performed by the printing hammer which is made operative to print one of the information bars 3 adjacent to the center bar.

According to the present invention, since each control bar, like bars 4 and 5, is printed by commonly using the printing hammer which is made operative to print the informations of either adjacent file or information code, the number of the printing hammers required can be minimized. In accordance with the minimization of the number of the printing hammers, moreover, the respective circuits for driving the printing hammers can be simplified so that the production cost can be accordingly spared.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A drum type line printer for printing bar codes in a line, comprising: a drum; a plurality of axial lines of imprintable bar code characters on the surface of the drum; in each line of the characters, there are a first plurality of information characters and at least one control character, and the control character is adjacent to at least one of the information characters in the line;
   a first plurality of printing hammers, one for each of the information characters, each for striking the respective information characters so that the information character may be printed;
   the one printing hammer for the at least one information character adjacent to the control character being of greater width than the other printing hammers for the one printing hammer to simultaneously strike both the control character and the adjacent at least one information character in that line.

2. A drum type line printed according to claim 1, wherein there is a respective control character arranged at each of the ends of each axial line; the control characters are struck by the one printing hammers which are the printing hammers that are operative to strike the first and last information characters in that line of characters.

3. A drum type line printer according to claim 1, wherein the control character in each line is at the same axial position along the drum for being struck by the one printing hammer.

4. A drum type line printer according to either of claims 1 or 3, wherein each control character in each line is identical.

* * * * *